United States Patent [19]
Dooley

[11] Patent Number: 5,195,853
[45] Date of Patent: Mar. 23, 1993

[54] QUILL FEED AND SPINDLE DRIVE ASSEMBLY

[75] Inventor: Robert A. Dooley, Maineville, Ohio

[73] Assignee: Cincinnati Milacron Inc., Cincinnati, Ohio

[21] Appl. No.: 685,627

[22] Filed: Apr. 15, 1991

[51] Int. Cl.⁵ .......................... B23B 47/20; B23Q 5/32
[52] U.S. Cl. .................................... 408/137; 408/129; 408/124
[58] Field of Search .................. 408/3, 124, 129, 130, 408/137, 135

[56] References Cited

U.S. PATENT DOCUMENTS

| Re. 31,627 | 7/1984 | Evans | 74/89.15 |
|---|---|---|---|
| 3,266,580 | 8/1966 | Clapp et al. | 408/130 X |
| 3,362,266 | 1/1968 | Krafft | 408/130 X |
| 3,791,756 | 2/1974 | Johnson | 408/139 |
| 3,822,958 | 7/1974 | Lewis | 408/46 |
| 3,859,001 | 1/1975 | Hoddinott et al. | 408/3 |
| 3,865,010 | 2/1975 | Hodgson | 408/10 X |
| 3,885,635 | 5/1975 | Menzel | 173/146 |
| 4,088,417 | 5/1978 | Kosmowski | 408/137 X |
| 4,115,026 | 9/1978 | Billeter | 408/10 |
| 4,175,898 | 11/1978 | Wood | 409/233 |
| 4,358,228 | 11/1982 | Stark | 408/35 |
| 4,486,128 | 12/1984 | Baker et al. | 408/3 |
| 4,913,600 | 4/1990 | Dierich et al. | 408/130 |

FOREIGN PATENT DOCUMENTS 6412170 1/1989 Japan .

OTHER PUBLICATIONS

Advertising brochure from Zagar, Inc., Cleveland, Ohio "Model MQ6 Ballscrew Quill Feed Unit", undated.
Advertising catalog from Zagar, Inc., "Mechanical Feed Units", undated.
Advertising brochure entitled "Series 5 Electra-Feed Drill Automatic Production Tool" from ARO Corp, Bryan, Ohio 1988.
Selected pages of "Power Transmission Design", Jan. 1990, 29th Annual Product Specification Guide.
Selected pages of "Power Transmission Design" Aug. 1990, Special Report: Linear Motion.

Primary Examiner—Steven C. Bishop
Attorney, Agent, or Firm—Frost & Jacobs

[57] ABSTRACT

A quill feed and spindle drive assembly has a bore formed along a longitudinal axis of a housing. A nut, rotatably mounted to the housing, carries a threaded quill which reciprocates along the axis through the housing. An elongate rotatable spindle passes through the bore and carries a tool at an outer end. The threaded quill is preferably a hollow screw, within which the spindle is mounted, and the quill and spindle are coextensive and linearly moved in unison along the axis. The quill provides both radial and axial thrust support, and forms a longitudinal guideway for the tool.

20 Claims, 5 Drawing Sheets

QUILL FEED AND SPINDLE DRIVE ASSEMBLY

TECHNICAL FIELD

This invention relates to automatic production tools such as precision hole drilling and tapping equipment, and, more particularly, to an improved quill feed and spindle drive assembly featuring reduced size and weight, and enhanced stroke length and versatility.

BACKGROUND ART

There are a wide variety of self-feeding drilling and machining devices such as self-contained drill units available in the industry for application in varied arrangements and incorporating combinations of electric and compressed air power. For example, U.S. Pat. No. 3,885,635 (which issued to K. Menzel) illustrates a two speed mechanical quill feed and spindle drive mechanism for a machine tool featuring a rotatable spindle mounted on bearings within a quill shaft. A ballscrew arrangement is provided whereby an internally threaded nut is rotated about the helically grooved quill shaft which is restrained against rotation within a housing. A motor mounted parallel to and above the quill provides rotational energy to the nut, thereby causing the quill to be axially displaced. A second motor is mounted in piggy-back style above the quill motor for providing rotational energy via a pulley and belt arrangement to a splined extension portion of a power shaft. The splined extension remains axially fixed while providing rotational energy to the telescoped spindle as it is reciprocated along with the quill.

A similar quill drive arrangement is shown in U.S. Pat. No. 31,627 (which issued to L. Evans). The Evans device is provided with a ballscrew/ball nut arrangement for longitudinal positioning of the quill as a result of rotational energy applied by a quill feed motor mounted above and parallel to the axis of longitudinal movement. A piggy-backed spindle drive motor is mounted above and parallel to the quill feed motor, and supplies rotational energy to a longitudinal drive spline via a similar pulley and belt arrangement. Unlike the Menzel device, however, the Evans quill is longitudinally driven by rotation of the ballscrew relative to an axially fixed ballscrew nut.

Yet another quill drive mechanism similar to the Menzel device is shown in U.S. Pat. No. 3,859,001 (which issued to W. Hoddinott, et al.), which also features a ballscrew quill feed unit wherein longitudinal movement is imparted to the ballscrew and its attached quill by rotation of a longitudinally fixed ballscrew nut. Rotation of the spindle is provided through a spline connection well known in the industry.

While all of these mechanisms provide operable mechanical feed units, and these general principles have been widely incorporated in many automatic production tools, they have all suffered from a variety of common shortcomings. Particularly, self-feeding mechanical quill feed and spindle drive assemblies available heretofore have generally been relatively large and cumbersome as a result of their piggy-back arrangement of drive motors and transmission assemblies. As illustrated in the patents mentioned above, units utilizing electric power for both the quill feed and spindle drive conventionally mounted the separate motors on top of one another and surmounting the housing of the assembly itself.

While at least one ballscrew actuated device available in the industry has featured orienting one of the drive motors in line with the longitudinal axis of the quill and spindle, as with the feed devices set forth in the patents discussed above, the drive motors have been designed to remain longitudinally stationary, and the spindle has been driven via an extensible spline arrangement to accommodate movement of the distal end of the spindle and the quill. Such arrangements added additional weight and moving parts to the system, and ultimately limited the stroke length of the device. The additional housing structure required to fully enclose and protect all of these moving parts also added additional weight and bulk to the assemblies Such housings were often provided in the form of cast iron, making these devices considerably massive and compromising their convenience, adaptability and applicability.

Some of the automatic production tools available in the industry substitute an air powered quill feed system for one or both of the electric motors. While such substitution can serve to reduce the overall size of the actual feed unit itself, it requires a source of compressed gas, feed lines, and air pressure control valves, pistons and the like Moreover, it has been found that air powered quill feed devices have additional power and range limitations in stroke length which can make such units undesirable or inappropriate for many applications.

Another method and apparatus for providing a machine tool which can be selectively displaced relative to a working surface is shown in U.S. Pat. No. 4,358,228 (which issued to G. Stark). Particularly, the Stark machine tool illustrates another device which utilizes a spline-type arrangement for driving a reciprocable spindle, and which utilizes a separate feed spindle which engages a feed nut to vertically displace the entire head part relative to the table for machining operations. The Stark device is exemplary of the relative complexity and size restrictions prohibiting the easy adaptability of many machine tools available in the industry.

Another arrangement wherein the entire head of a multi-spindle drilling machine is reciprocated relative to a work table is shown in U.S. Pat. No. 3,822,958 (which issued to J. Lewis). While Lewis contemplates limited individual adjustment of each drill motor mounted in its reciprocable head, the rack and scroll plate arrangement provided for such adjustment is limited to relatively minor vertical adjustments which are to be preset prior to machining operations.

Consequently, while a relatively wide variety of automatic production tools utilizing various combinations of electric and air powered drive systems have been available in the industry, heretofore, these devices have suffered from slow operation, insufficient stroke length, and/or excessive size or weight restrictions which limited applicability and adaptability. Additionally, most of these devices were difficult to change over to different operations as a result of their size, weight, and complexity.

DISCLOSURE OF THE INVENTION

It is an object of this invention to address the above-described problems and shortcomings of automatic production tools and quill feed units heretofore available in the industry.

It is another object of the present invention to provide an improved, programmable mechanical quill feed and spindle drive assembly which features reduced weight and size.

It is also an object of the present invention to provide an automatic production tool which features a simplified arrangement wherein a rotatable spindle is housed within and guided off of a ballscrew quill which is substantially co-extensive with the spindle.

It is yet another object of the present invention to provide a quill feed and spindle drive assembly which includes a spindle motor connected to the quill for reciprocable movement therewith along the longitudinal axis of the assembly, and eliminating all spline and slip joints.

In accordance with one aspect of the present invention, there is provided a quill feed and spindle drive assembly having a housing with a bore formed along a longitudinal axis of the housing. A rotatable spindle of the predetermined fixed longitudinal length passes through the bore and has a tool attachment device at its distal end. An externally threaded quill is located coaxially over the spindle and slidably mounted in the housing for longitudinal reciprocation along the axis. The threaded quill is fixed against rotational movement relative to the housing, and a rotatable nut is mounted over a Portion of the quill and fixed against movement along the longitudinal axis. A spindle motor for rotating the spindle is connected to the quill for reciprocable movement therewith along the longitudinal axis, and, in a preferred embodiment, an electrical servo motor is provided for rotating the nut relative to the quill to longitudinally reciprocate the quill, spindle and spindle motor along the axis relative to the housing. In a preferred embodiment, the quill is also provided as a hollow ballscrew within which the spindle is rotatably supported. It is also contemplated that the housing may be attached to a mounting base to enable manual adjustment of the axial position of the housing relative to the mounting base for tool setup.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
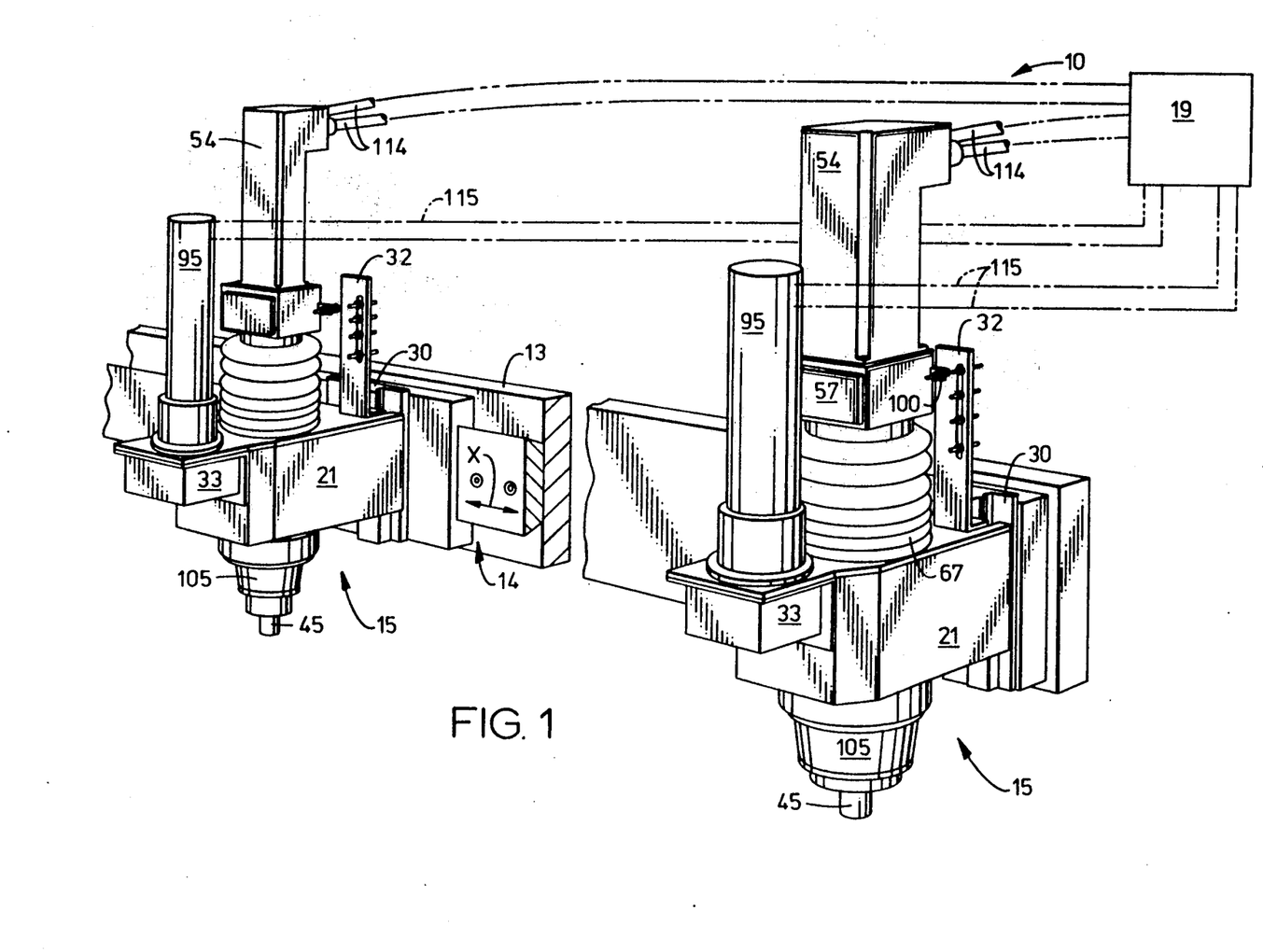
FIG. 1 is a partial perspective view of a machining device incorporating a plurality of quill feed and spindle drive assemblies made in accordance with the present invention.

Referring now to the drawings in detail, wherein like numerals indicate the same elements throughout the views, FIG. 1 illustrates an automatic machining device 10 comprising a main frame 13 supporting one or more automatic production tools such as quill feed and spindle drive assemblies 15 made in accordance herewith. This setup is intended merely as a generic example of the many applications in which the quill feed and drive assembly of the present invention can be advantageously implemented. Main frame 13 is illustrated as including a slide and slideway arrangement 14 for reciprocably mounting one or more assemblies 15 for selective movement along an axis X, indicated by the arrow shown.

Machining device 10 might be provided as part of a stationary machining center, or incorporated in a movable structure, as desired. Controls 19 (shown schematically in FIG. 1) might be provided to enable preprogramed positions of quill feed and spindle drive assemblies 15 along support 13, as desired. Assemblies 15 are illustrated as being alternately attached via mounting bases 30, either directly to tool support 13, or indirectly via slide arrangement 14. Automatic machining device 10 could comprise any number of assemblies 15 in order to facilitate multiple machining operations to be aligned and performed simultaneously, or in any desired sequence.

Details of a preferred embodiment of quill feed and spindle drive assembly 15 are further illustrated in FIGS. 2–7. Particularly, assembly 15 comprises a housing 20 having an at least partially hollow body 21 with a bore 22 formed along a longitudinal axis Z thereof. Longitudinal bore 22 may also preferably be formed with bearing seats 22a and 22b to receive bearings for rotatable support of the spindle, as will be described in detail below.

Figure 5:
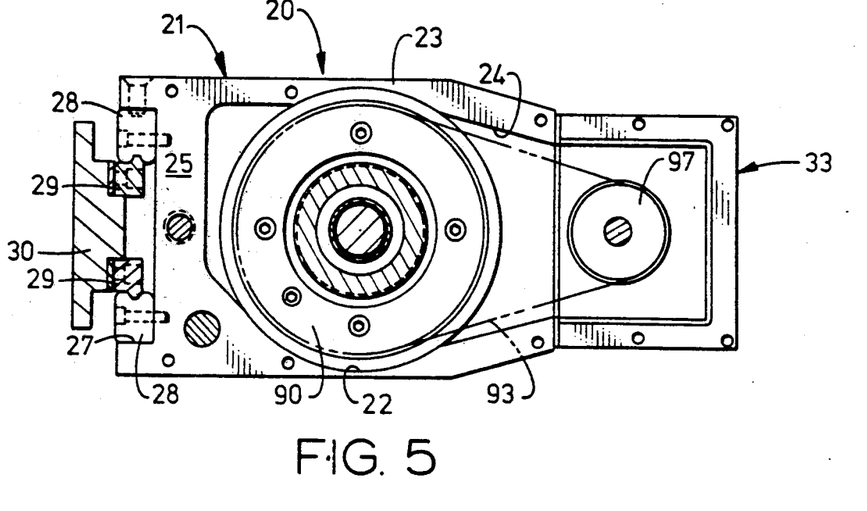
FIG. 5 is a cross-sectional view of the quill feed and spindle drive assembly of FIG. 4, taken along line 5—5 thereof.

As best seen in FIG. 5, housing 20 further comprises peripheral sidewalls 23, a substantially hollow interior 24, rear wall 25, and a top plate 26. Rear wall 25 of housing 20 may also preferably include a longitudinal recess 27 for receiving a pair of oppositely disposed slides 28, which are illustrated as including inwardly facing grooves. Slides 28 are preferably provided to correspond and interact with longitudinal slideways 29 associated with mounting base 30 which include outwardly extending tongues slidably received within the grooves of slides 28. In this way, slidable connection of housing 20 to mounting base 30 is provided. This slide/slideway connection can be provided such as by linear motion systems as available from THK America, Inc. of Elk Grove Village, Ill.

Figure 4:
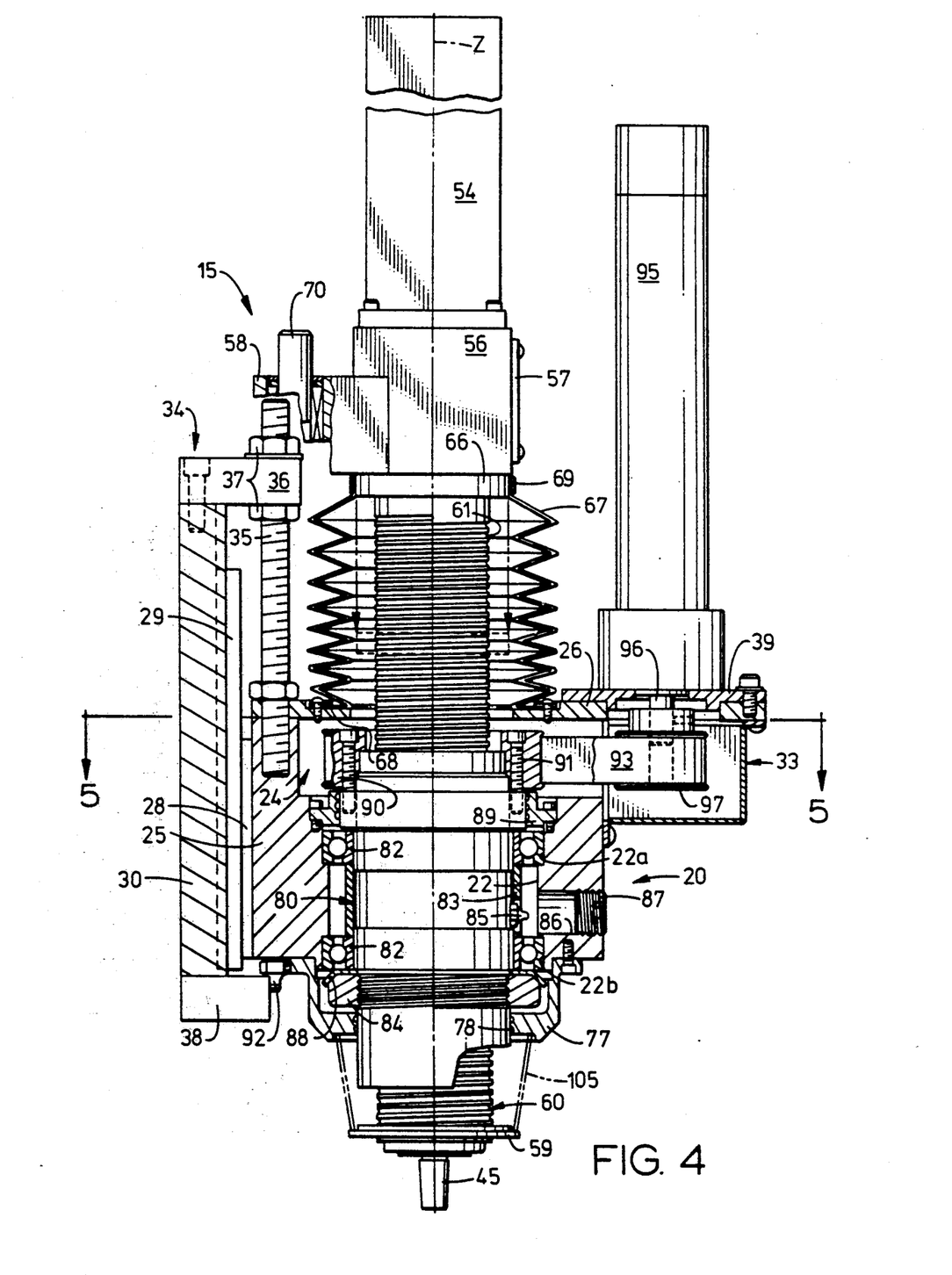
FIG. 4 is a partially broken away left side view of the quill feed and spindle drive assembly of FIGS. 1 and 2.
Figure 6:
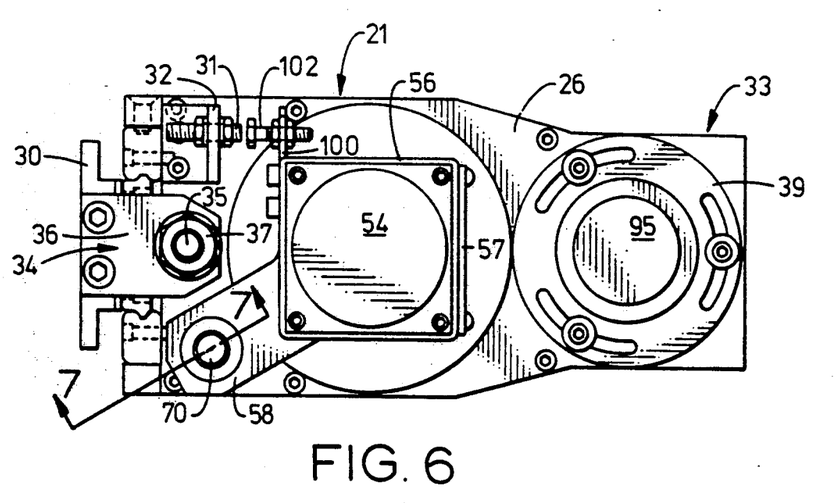
FIG. 6 is a top plan view of the assembly of FIG. 4.

As best illustrated in FIGS. 4 and 6, an adjustment screw or all-thread member 35 is preferably threadedly anchored adjacent top plate 26 and rear wall 25, and extends upwardly therefrom. The upper or distal end of adjustment screw 35 is received in a bore formed through adjustment collar 36, and is secured thereto by a pair of lock nuts 37. Manual axial adjustment of housing 20 relative to mounting base 30 can thereby be accomplished by appropriate location of lock nuts 37, effectively adjusting the axial position of quill feed and spindle drive assembly 15 relative to mounting base 30. This adjustment can be utilized to manually Preset the axial location of assembly 15 relative to a work piece or work surface without affecting the axial working stroke of assembly 15 and its means 45 for attaching a tool. Vertical adjustment of lock nuts 37 along screw 35, in turn, causes longitudinal movement of housing 20 along axis Z, moving slides 28 along slideways 29 as discussed.

The incorporation of means 34 for selectively adjusting the axial position of housing 20 along longitudinal axis Z provides an additional dimension of adjustability and adaptability to assembly 15 in use. Particularly, longer effective strokes for a tool held within assembly 15 can be accomplished without modifying the length of quill 60, and without making any equipment changes, simply by adjusting screw 35 appropriately. Adjustment means 34 can also be utilized to optimize the necessary reciprocation stroke of the quill and its rotatably journaled spindle by making appropriate adjustments of screw 35. These adjustments can improve productivity by minimizing required stroke length and speeding up the machining process.

Extending outwardly from the front portions of body 21 is a housing extension 33 provided to support a quill servo drive motor 95, and to house drive pulley 97 and timing belt 93. It is preferred that a single top plate 26 be provided over both main housing body 21 and extension 33, as seen best in FIGS. 4 and 6.

Reciprocably mounted through bore 22 of housing 20 is threaded quill 60. As indicated, quill 60 is provided with an external ballscrew track 61. As illustrated in FIG. 4, the track 61 cooperates with rotatable nut 80 which is rotatably mounted thereover in a threaded or threadable connection. This threadable connection can be provided by interaction of corresponding internal threads formed within nut 80 with external threads of quill 60, but is preferably provided as a ballscrew arrangement, wherein nut 80 includes an internal ballscrew groove arrangement to correspond with an external ballscrew groove of quill 60 to maintain a plurality of balls therebetween in a known ballscrew configuration. Threaded quill 60 has an axial bore throughout, including bearing recesses or seats 64 for receiving a duplex pair of angular-contact bearings 44 for rotatably supporting a precision spindle 40, as best seen in FIG. 3.

Figure 3:
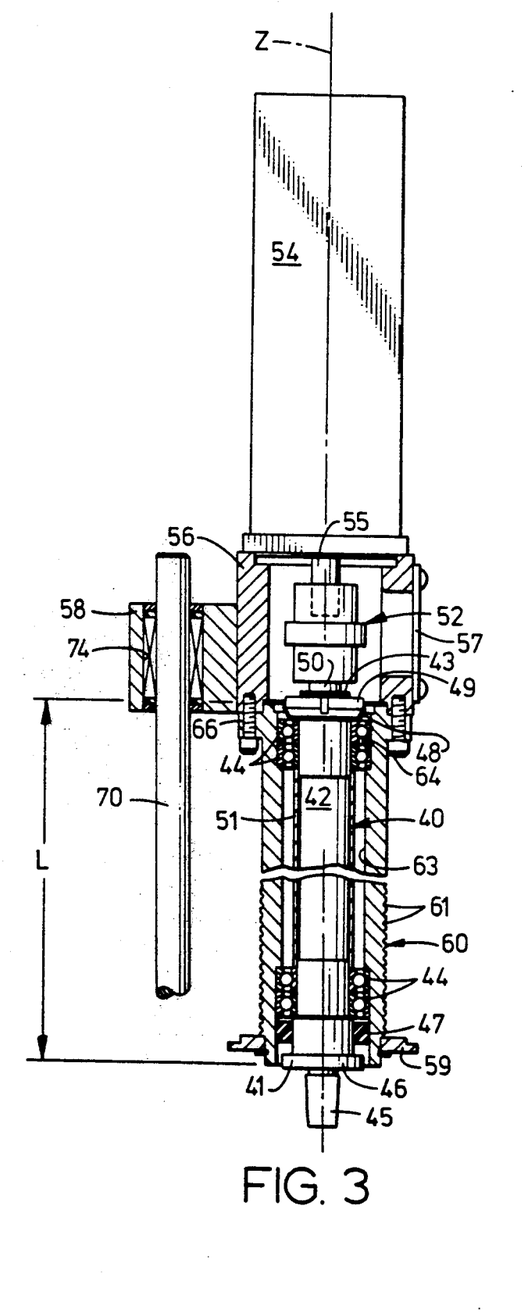
FIG. 3 is a partial cross-sectional view of a preferred spindle drive arrangement of the quill feed and spindle drive assembly of FIG. 2.

Turning to FIG. 3, it can be seen that elongate spindle 40 includes a front end 41, a rear end 43, and a cylindrical shaft 42 extending therebetween. The spindle shaft 42 is located with a duplex tandem mounting of angular-contact bearings 44 oriented to share the thrust load inherently encountered in automatic drilling devices and other machining operations is illustrated to provide rotatable support of spindle 40 within quill 60. Spindle 40 preferably comprises a predetermined fixed longitudinal length L substantially corresponding to the coextensive length of quill 60. As will be understood, the quill thread provides both radial and axial thrust support, and forms the longitudinal guideway for a supported tool, as the coextensive quill and spindle assembly is moved linearly in unison.

A drive tail 50 is shown as extending rearwardly from rear end 43 to interact with drive coupling 52. Particularly, spindle drive motor 54 is illustrated as comprising a servo motor (e.g., as available from Pacific Scientific of Rockford, Ill.) which is coaxially mounted on drive housing 56 such that its drive shaft 55 extends forwardly into drive coupling 52 to provide rotational energy to spindle 40 and its tool attachment means 45. Means 45 for attaching a tool can comprise a chuck, (e.g., chuck 106 of FIG. 2) Jacobs taper (as illustrated in FIGS. 3 and 4), or other tool attachment structure well known in the industry. Drive coupling 52 is also of known design, such as available from Lovejoy, Inc. of Downers Grove, Ill. Drive housing 56 is illustrated as including an access opening with cover 57 to facilitate assembly and maintenance operations, and includes an anti-rotation support 58 extending outwardly from its rearward portions.

Figure 7:
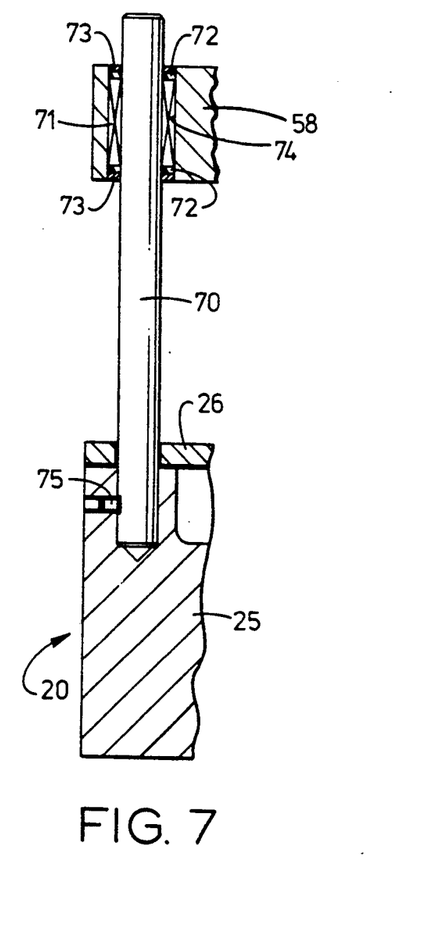
FIG. 7 is a partial cross-sectional view of the anti-rotation guide arrangement of the quill feed and spindle drive assembly of FIG. 6, taken along line 7—7 thereof.

As best illustrated in FIGS. 3, 4 and 7, anti-rotation support 58 is illustrated as part of a preferred means for fixing quill 60 against rotation relative to servo motor 54 and housing 20. Support 58 comprises a bore 74 oriented substantially parallel to longitudinal axis Z, and housing a ball bushing 71, seals 72 and retainer rings 73 to slidably mount support 58 to anti-rotation pin 70. The lower portion of pin 70 is anchored within rear wall 25 of housing 20, such as via a set screw 75. As will be understood, pin 70 prevents rotation of quill 60 as nut 80 is rotated, and quill 60 and spindle 40 are thus reciprocated along longitudinal axis Z. The exact structure of the means used to fix quill 60 against rotation is not critical to the operation of this invention and can be substituted as desired.

As best illustrated in FIG. 3, spindle 40 includes a front face 46 adjacent front end 41 from which is outwardly extended means 45 for attaching a tool thereto. Behind front face 46 and within bore 63 of the quill, spindle 40 is preferably sealed, such as by annular seal 47. Adjacent rear end 43, spindle 40 threadedly receives a lock nut 49, with a lock washer 48, to retain the position of spindle 40 with quill 60. As indicated, a spacer 51 may also be fitted between pairs or sets of bearings 44 to assure proper bearing preload.

As also illustrated in FIG. 3, threaded quill 60 preferably comprises an outwardly extending flange 66 attaching quill 60 to drive housing 56 and servo motor 54. A retainer ring 59 is provided adjacent the distal end of quill 60 to provide attachment of extendible cover 105, as will be described below.

Turning to FIG. 4, the rotatable nut 80 is threaded over a portion of quill 60. Nut 80, quill 60, and a plurality of recirculating balls (not shown) form an anti-friction preloaded screw drive in a well-known manner. As illustrated, it is preferred that nut 80 be supported for rotation within bore 22 of housing 20, such as by a spaced pair or duplex set of angular-contact bearings 82. Bearing seats 22a and 22b are preferably provided along bore 22 to secure the assembly. A spacer 83 may be provided for maintaining the preload of bearings 82. A lock nut 84 and lock washer 88 serve to axially retain nut 80 with housing 20.

A grease fitting 85 is located on nut 80 for lubricating the ballscrew arrangement, whereby, when aligned with lubrication passageway 86, fitting 85 can be accessed from the exterior of housing 20 by removal of a pipe plug 87. A grease fitting 92 on housing 20 is used for lubricating bearings 82, through suitable interdrilling (not shown). An upper labyrinth seal 89 and a lower cover 77 are mounted to housing 20. A lower seal 78 within lower cover 77, together with upper seal 89, serves to provide protection against bearing grease contamination.

The upper end of rotatable nut 80, has a driven timing belt pulley 90, connected by a plurality of bolts 91, to provide a positive drive. The driven pulley 90 is rotatable within housing 20, and is connected via timing belt 93 to drive pulley 97 affixed to the drive shaft 96 of a servo motor 95. Servo motor 95 is illustrated as being connected via mounting ring 39 to the upper surface of top plate 26, with its drive shaft 96 extending into housing extension 33. As will be understood, rotational movement imparted by servo motor 95 will be transmitted to ball nut 80, thereby rotating nut 80 relative to quill 60 to longitudinally reciprocate quill 60, spindle 40, and spindle motor 54 attached to the quill in a unitary manner. It should be understood that the ballscrew/nut arrangement illustrated could be substituted with a precision traditional screw thread/nut set up having, for example, an acme form, although use of a ballscrew is preferred.

As best illustrated in FIG. 4, an expandable/collapsible dust cover 67 is provided between top plate 26 and quill 60. Cover 67 is preferably a vulcanized rubber bellows or similar flexible yet durable material. Linear-motion device covers of this type are available in the industry from A&A Mfg. Co., Inc., New Berlin, Wis. Cover 67 is connected via attachment ring 68 about its lower periphery and at its upper end by an annular attachment band 69 circumscribing the attachment flange 66. Cover 67 protects the quill/ballscrew nut arrangement from exposure to dust and debris commonly associated with machining processes.

At the lower end of housing 20, there is preferably provided a lower cover 77 which includes annular seal 78 for providing a rotatable seal about the periphery of ballscrew nut 80. To further obviate the infiltration of dust or debris into the moving parts of quill feed and spindle drive assembly 15, there is illustrated an extendable cover 105 mounted on the rear surface of lower cover 77 and spanning the variable distance between cover 77 and retainer ring 59 on quill 60. It will also be appreciated that being located closer to the tool attachment chuck or taper 45, extendable cover 105 may well be subjected to a more hostile environment (e.g., metal shavings from machine parts, sparks and the like) than will be the bellows-like cover 67. For this reason, it is preferred that cover 105 be provided of more durable material such as metal or armored flexible material. An extendable steel cover structure available from Century Cover of Burlington, N.J. (sold under the name "Elasticone") is ideal for this application.

Once a mechanical quill feed and spindle drive assembly 15 of the present invention is mounted for operation, either by directly attaching its mounting slide base 30 to a fixture, or via alternate mounting arrangements, the assembly can be connected (e.g., through wires 114 and 115) to a control or CNC device (e.g., 19). Servo motors 54 and 95 can thereby be programmed as desired to rotate a tool held within tool attaching means 45, and feed the tool by rotating ballscrew nut 80 to impose unitary axial movement of quill 60, its co-extensive spindle 40, and quill drive housing 56 and drive motor 54. As will also be understood, threaded quill 60 provides both radial and axial thrust support, as well as longitudinal guidance, for a tool held within the device.

Figure 2:
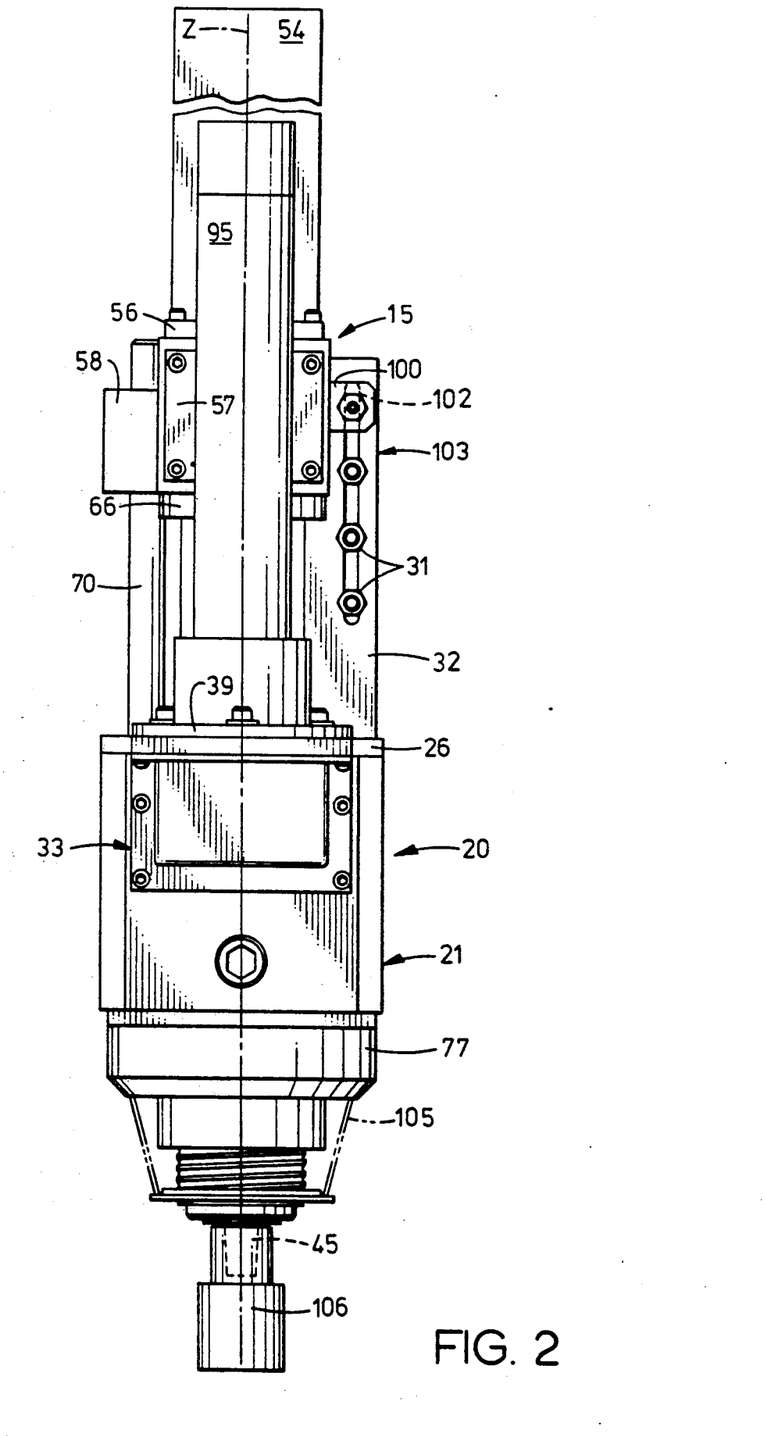
FIG. 2 is a partial front elevational view of a quill feed and spindle drive assembly of the present invention.

As seen in FIG. 2, an axial position sensor means 130 is illustrated as including a support flange 32 extending upwardly from top plate 26 of housing 20. Located at predetermined spaced positions along flange 32 can be a plurality of axial position sensors or limit switches 31 designed to interact with limit switch dog 102. As best seen in FIG. 6, limit switch dog 102 can be situated in alignment with flange 32 and sensors 31, such as by attachment to support arm 100 cantilevered off of drive housing 56. These limit switches can be tied into a control system for sensing axis range limits.

As can also be appreciated, coupling spindle motor 54 in a fixed axial position relative to spindle 40 for reciprocation along axis Z avoids overlapping and additive lengths of spindle/spline assemblies and slip joints of previous quill feed devices, thereby reducing unnecessary parts, weight and space requirements. Further, using the quill thread as the main tool guideway minimizes the size and weight of the assembly by obviating the need for independent slideways, while providing both radial and axial thrust support in use. The arrangement of spindle 40 and quill or ballscrew 60 as coextensive members of substantially equal length further contributes to maximum compactness of the overall assembly, whereby a plurality of assemblies 15 can be mounted in close configuration for a wide variety of applications, and can be easily adapted and interchanged, making them more universal than previously available devices.

Having shown and described the preferred embodiments of the present invention, further adaptions of the quill feed and spindle drive assembly described herein can be accomplished by appropriate modifications by one of ordinary skill in the art without departing from the scope of the present invention. Several of these potential modifications have been mentioned, and others will be apparent to those skilled in the art. Accordingly, the scope of the present invention should be considered in terms of the following claims and is understood not to be limited to the details of structure and operation shown and described in the specification and drawings.

I claim:

1. A quill feed and spindle drive assembly comprising:
   a housing having a bore formed along a longitudinal axis thereof;
   an elongate rotatable spindle of predetermined fixed longitudinal length passing through said bore;
   an externally threaded quill coaxially telescoped over said spindle, said quill slidably mounted in said housing for longitudinal reciprocation along said axis, and fixed against rotational movement relative to said housing, said quill and spindle being of substantially equal length and coextensive with one another and fixed together for simultaneous axial movement, said spindle being journaled for rotation relative to said quill;
   a rotatable nut mounted over a portion of said quill in a threadable connection, said nut fixed against movement along said longitudinal axis relative to said housing, said nut providing a guideway for slidably moving and guiding said quill;
   a spindle motor for rotating said spindle and connected to said quill for reciprocable movement therewith along said longitudinal axis; and
   means for selectively rotating said nut relative to said quill to longitudinally reciprocate said quill, spindle and spindle motor along said axis and relative to said housing.

2. The quill feed and spindle drive assembly of claim 1, wherein said quill comprises a hollow ballscrew within which said spindle is rotatably supported.

3. The quill feed and spindle drive assembly of claim 1, further comprising means for anchoring said housing in a fixed position for use.

4. The quill feed and spindle drive assembly of claim 3, wherein said anchoring means comprises a mounting base to which said housing is attached.

5. The quill feed and spindle drive assembly of claim 1, wherein said spindle motor has a drive shaft which is aligned coaxially with said spindle and coupled thereto in a fixed axial relationship.

6. The quill feed and spindle drive assembly of claim 2, wherein said quill comprises an external ballscrew thread, said nut carries said threaded quill, and said quill thread provides both radial and axial thrust support for said spindle and a tool attached thereto.

7. A quill feed and spindle drive assembly comprising:
a housing having a bore formed along a longitudinal axis thereof;
an elongate rotatable spindle of predetermined fixed longitudinal length passing through said bore;
an externally threaded quill coaxially telescoped over said spindle, said quill slidably mounted in said housing for longitudinal reciprocation along said axis, and fixed against rotational movement relative to said housing;
a rotatable nut mounted over a portion of said quill in a threadable connection, said nut fixed against movement along said longitudinal axis relative to said housing, said nut providing a guideway for slidably moving and guiding said quill;
a spindle motor for rotating said spindle and connected to said quill for reciprocable movement therewith along said longitudinal axis;
means for selectively rotating said nut relative to said quill to longitudinally reciprocate said quill, spindle and spindle motor along said axis and relative to said housing;
means for anchoring said housing in a fixed position for use, said anchoring means comprising a mounting base to which said housing is attached; and
means for selectively adjusting the axial position of said housing relative to said mounting base.

8. The quill feed and spindle drive assembly of claim 7, wherein the adjustable attachment of said housing to said mounting base is provided by a slide and slideway combination.

9. A quill feed and spindle drive assembly comprising:
a housing having a bore formed along a longitudinal axis thereof;
an elongate rotatable spindle of predetermined fixed longitudinal length passing through said bore;
an externally threaded quill coaxially telescoped over said spindle, said quill slidably mounted in said housing for longitudinal reciprocation along said axis, and fixed against rotational movement relative to said housing;
a rotatable nut mounted over a portion of said quill in a threadable connection, said nut fixed against movement along said longitudinal axis relative to said housing, said nut providing a guideway for slidably moving and guiding said quill, said quill thread providing the main tool guideway for both radially and axially supporting and guiding said spindle in use;
a spindle motor for rotating said spindle and connected to said quill for reciprocable movement therewith along said longitudinal axis; and
means for selectively rotating said nut relative to said quill to longitudinally reciprocate said quill, spindle and spindle motor along said axis and relative to said housing.

10. A quill feed and spindle drive assembly comprising:
a housing having a bore formed along a longitudinal axis thereof;
an elongate rotatable spindle of predetermined fixed longitudinal length passing through said bore;
an externally threaded quill coaxially telescoped over said spindle, said quill slidably mounted in said housing for longitudinal reciprocation along said axis, and fixed against rotational movement relative to said housing, said quill and spindle being substantially coextensive with one another and fixed together for simultaneous axial movement, said spindle being journaled for rotation relative to said quill;
a mounting base to which said housing is attached;
means for selectively adjusting the axial position of said housing relative to said mounting base;
a rotatable nut mounted over a portion of said quill in a threadable connection, said nut fixed against movement along said longitudinal axis relative to said housing, and said nut providing a guideway for slidably moving and guiding said quill;
a spindle motor drivingly connected for rotating said spindle and connected to said quill for reciprocable movement therewith along said longitudinal axis; and
means for selectively rotating said nut relative to said quill to longitudinally reciprocate said quill, spindle and spindle motor along said axis and relative to said housing.

11. The quill feed and spindle drive assembly of claim 10, wherein said quill comprises a hollow ballscrew within which said spindle is rotatably supported.

12. The quill feed and spindle drive assembly of claim 10, wherein said means for selectively adjusting the axial position of said housing relative to said mounting base comprises a slide and slideway combination.

13. The quill feed and spindle drive assembly of claim 10, wherein said spindle motor is coupled in fixed axial position relative to said spindle.

14. The quill feed and spindle drive assembly of claim 10, wherein said quill has a longitudinal length substantially equal to said fixed longitudinal length of said spindle.

15. A quill feed and spindle drive assembly comprising:
a housing having a bore formed along a longitudinal axis thereof;
an elongate rotatable spindle of predetermined fixed longitudinal length passing through said bore, said spindle having a front end and means for attaching a tool adjacent said front end;
an externally threaded quill coaxially telescoped over said spindle, said quill comprising a hollow ballscrew slidably mounted in said housing for longitudinal reciprocation along said axis, and fixed against rotational movement relative to said housing, said quill and spindle being substantially coextensive with one another and fixed together for simultaneous axial movement, and said spindle being journaled for rotation relative to said quill;
a mounting base to which said housing is attached;
means for selectively adjusting the axial position of said housing relative to said mounting base;
a rotatable ballscrew nut mounted over a portion of said quill in a threadable connection, said nut fixed against movement along said longitudinal axis relative to
said housing and providing a guideway for reciprocation of said quill;
a spindle motor for rotating said spindle, said motor coupled in fixed axial position relative to said spindle and connected to said quill for reciprocable movement therewith along said longitudinal axis; and
means for selectively rotating said nut relative to said quill to longitudinally reciprocate said quill, spindle and spindle motor along said axis and relative to said housing.

16. The quill feed and spindle drive assembly of claim 15, wherein the adjustable attachment of said housing to said mounting base is provided by a slide and slideway arrangement.

17. The quill feed and spindle drive assembly of claim 16, further comprising an adjustment screw which enables selective adjustment of said housing along said slide and slideway arrangement.

18. The quill feed and spindle drive assembly of claim 15, wherein said quill is fixed against rotational movement relative to said housing by a pin attached to said housing and extending in a direction parallel with said longitudinal axis, and a collar attached to said quill, said pin slidably received by said collar, said collar reciprocating along said pin as said quill is longitudinally reciprocated.

19. The quill feed and spindle drive assembly of claim 15, further comprising an expandable/collapsible cover attached to said housing and said quill to protect said quill and said ballscrew nut from dust and debris.

20. The quill feed and spindle drive assembly of claim 15, wherein said quill has a longitudinal length substantially equal to said fixed length of said spindle.

* * * * *